(12) United States Patent
Turcotte et al.

(10) Patent No.: US 11,859,555 B2
(45) Date of Patent: Jan. 2, 2024

(54) SYSTEMS AND METHODS FOR STARTING A GAS TURBINE ENGINE

(71) Applicant: PRATT & WHITNEY CANADA CORP., Longueuil (CA)

(72) Inventors: Jasmin Turcotte, Mont-Saint-Hilaire (CA); Ioan Sabau, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/096,140

(22) Filed: Jan. 12, 2023

(65) Prior Publication Data
US 2023/0143279 A1 May 11, 2023

Related U.S. Application Data

(63) Continuation of application No. 16/576,031, filed on Sep. 19, 2019, now Pat. No. 11,578,661.

(51) Int. Cl.
*F02C 7/26* (2006.01)
*F02C 9/26* (2006.01)

(52) U.S. Cl.
CPC .................. *F02C 7/26* (2013.01); *F02C 9/26* (2013.01); *F05D 2260/85* (2013.01); *F05D 2260/99* (2013.01); *F05D 2270/70* (2013.01)

(58) Field of Classification Search
CPC .. F02C 7/22; F02C 7/228; F02C 7/232; F02C 7/26; F02C 7/262; F02C 7/264; F02C 7/266; F02C 9/16; F02C 9/20; F02C 9/26; F02C 9/28; F05D 2260/85; F05D 2260/99
See application file for complete search history.

(56) References Cited

U.S. PATENT DOCUMENTS

| 4,173,119 | A | 11/1979 | Greune et al. |
| 4,296,601 | A | 10/1981 | Martin |
| 5,129,221 | A | 7/1992 | Walker et al. |
| 5,442,907 | A * | 8/1995 | Asquith .................. F02C 7/264 60/39.821 |
| 5,907,949 | A | 6/1999 | Falke et al. |
| 6,148,601 | A | 11/2000 | Jones et al. |
| 8,806,872 | B2 * | 8/2014 | Pieussergues ............ F23R 3/28 60/786 |
| 8,925,328 | B2 | 1/2015 | Rodd et al. |
| 9,328,666 | B2 | 5/2016 | Jain et al. |
| 9,689,313 | B2 | 6/2017 | Zordan et al. |
| 9,896,958 | B2 | 2/2018 | Foiret et al. |
| 10,072,579 | B2 | 9/2018 | Saito |
| 10,302,020 | B2 | 5/2019 | Gutz et al. |
| 10,309,315 | B2 | 6/2019 | Jain et al. |
| 11,149,647 | B2 | 10/2021 | Husband et al. |
| 2003/0056521 | A1 | 3/2003 | Dewis |

(Continued)

*Primary Examiner* — Alain Chau
(74) *Attorney, Agent, or Firm* — Norton Rose Fulbright Canada LLP

(57) ABSTRACT

Methods and systems for starting an aircraft gas turbine engine are described. The method comprises, in a first phase of a startup upon receipt of a start request, modifying a first set of engine control parameters to cause light-up; in a second phase of the startup, modifying a second set of engine control parameters to set conditions for light-around; and in a third phase of the startup, modifying a third set of engine control parameters to propagate a flame around a combustor of the gas turbine engine.

18 Claims, 6 Drawing Sheets

(56) References Cited

U.S. PATENT DOCUMENTS

| | | |
|---|---|---|
| 2006/0037326 A1 | 2/2006 | Mehrer et al. |
| 2008/0271461 A1 | 11/2008 | Terlecki et al. |
| 2009/0235638 A1 | 9/2009 | Jain et al. |
| 2010/0037612 A1* | 2/2010 | Futa .................. F02C 7/228 60/734 |
| 2011/0094241 A1 | 4/2011 | Rodd et al. |
| 2012/0079831 A1 | 4/2012 | Kirzhner et al. |
| 2013/0118181 A1 | 5/2013 | Pieussergues et al. |
| 2013/0192195 A1 | 8/2013 | Wehmeier |
| 2013/0219911 A1 | 8/2013 | Dudebout et al. |
| 2014/0260294 A1 | 9/2014 | Farshchian |
| 2015/0176496 A1 | 6/2015 | Zordan et al. |
| 2015/0285093 A1 | 10/2015 | Foiret et al. |
| 2016/0281611 A1 | 9/2016 | Stockwell |
| 2016/0290239 A1 | 10/2016 | Jain et al. |
| 2016/0305329 A1 | 10/2016 | Saito |
| 2017/0002744 A1 | 1/2017 | Poumarede et al. |
| 2017/0016401 A1 | 1/2017 | Stockwell |
| 2018/0135534 A1* | 5/2018 | Ewens .................. F02C 9/28 |
| 2018/0201386 A1 | 7/2018 | Strauss et al. |
| 2020/0173367 A1 | 6/2020 | Husband et al. |
| 2020/0173369 A1 | 6/2020 | Husband et al. |

* cited by examiner

206

314 — TRANSITION FUEL DIVIDER VALVE TO EQUALIZED POSITION BASED ON PARAMETERS A3

316 — REDUCE FUEL FLOW BASED ON PARAMETERS A4

318 — TRANSITION VGMs TO ENGINE ACC. POSITION

FIG. 3D

SYSTEMS AND METHODS FOR STARTING A GAS TURBINE ENGINE

CROSS REFERENCE TO RELATED APPLICATION

This application is a continuation of U.S. patent application Ser. No. 16/576,031 filed on Sep. 19, 2019, the entire contents of which are hereby incorporated by reference.

TECHNICAL FIELD

The present disclosure relates generally to gas turbine engines, and more particularly to starting gas turbine engines.

BACKGROUND OF THE ART

Gas turbine engines in aircraft are started by rotating the compressor to a speed that provides sufficient pressurized air to the combustion chambers. Many variations of engine starting have been used, with trade-offs being made between weight savings, simplicity of operation and reliability.

Gas turbine engines are sometimes shutdown in flight, intentionally to save fuel or unintentionally due to fuel starvation or flameout after a compressor stall. Inflight restarts are more complex than on-ground starts, as many additional parameters can affect the outcome of the restart procedure.

Therefore, improvements are needed.

SUMMARY

In accordance with a broad aspect, there is provided a method for starting an aircraft gas turbine engine. The method comprises, in a first phase of a startup upon receipt of a start request, modifying a first set of engine control parameters to cause light-up; in a second phase of the startup, modifying a second set of engine control parameters to set conditions for light-around; and in a third phase of the startup, modifying a third set of engine control parameters to propagate a flame around a combustor of the gas turbine engine.

In accordance with another broad aspect, there is provided a system for starting an aircraft gas turbine engine. The system comprises a processing unit and a non-transitory computer-readable medium having stored thereon program instructions. The program instructions are executable by the processing unit for, in a first phase of a startup upon receipt of a start request, modifying a first set of engine control parameters to cause light-up; in a second phase of the startup, modifying a second set of engine control parameters to set conditions for light-around; and in a third phase of the startup, modifying a third set of engine control parameters to propagate a flame around a combustor of the gas turbine engine.

In accordance with yet another broad aspect, there is provided a computer-readable storage medium having stored thereon program code executable by a processor for starting an engine. The program code is executable for, in a first phase of a startup upon receipt of a start request, modifying a first set of engine control parameters to cause light-up; in a second phase of the startup, modifying a second set of engine control parameters to set conditions for light-around; and in a third phase of the startup, modifying a third set of engine control parameters to propagate a flame around a combustor of the gas turbine engine.

Features of the systems, devices, and methods described herein may be used in various combinations, in accordance with the embodiments described herein.

BRIEF DESCRIPTION OF THE DRAWINGS

Reference is now made to the accompanying figures in which:

FIGS. 3A-3D are flowcharts depicting specific embodiments for the steps of the method of FIG. 2;

It will be noted that throughout the appended drawings, like features are identified by like reference numerals.

DETAILED DESCRIPTION

Figure 1:
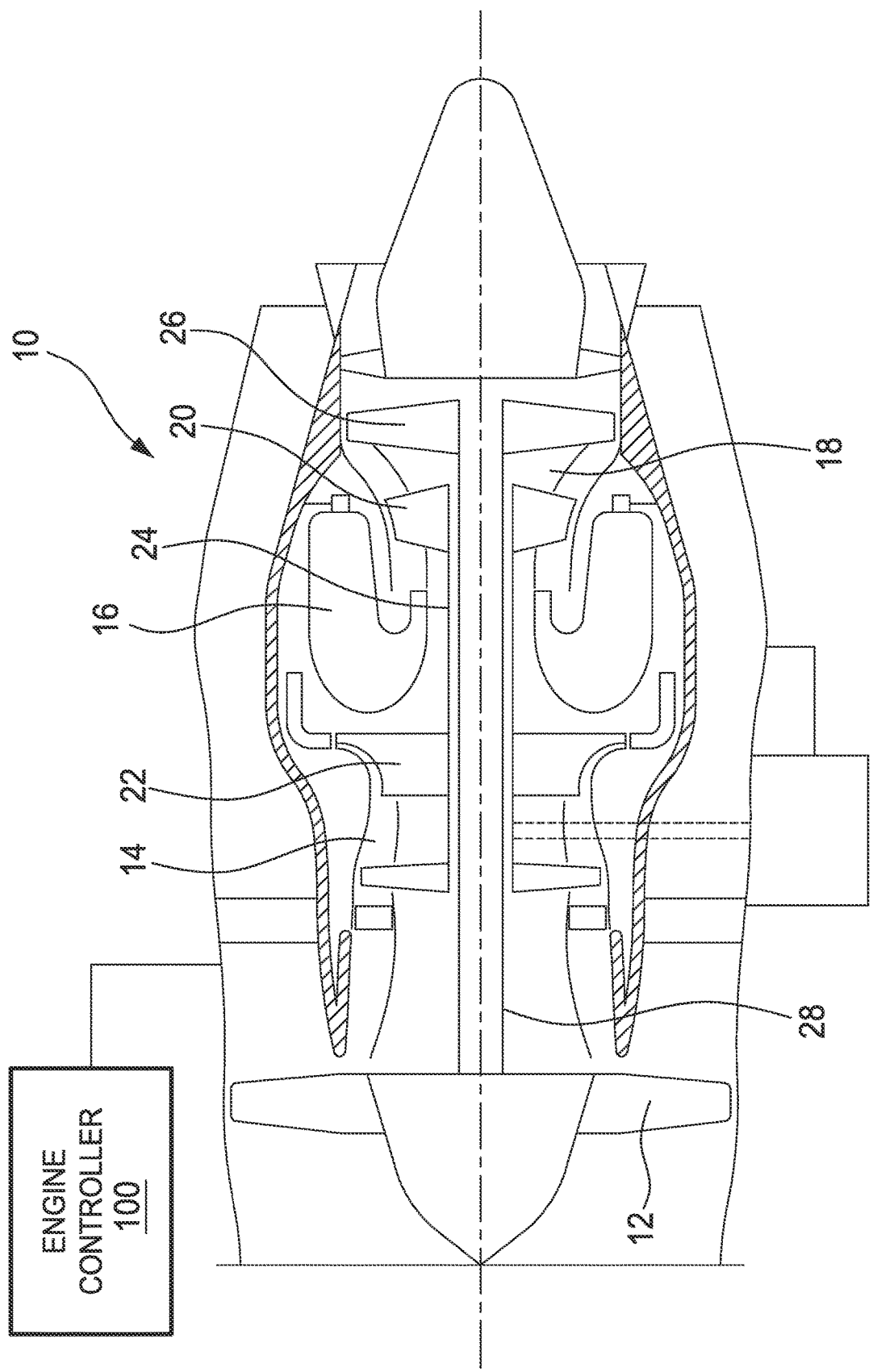
FIG. 1 is a schematic cross-sectional view of an example gas turbine engine.

FIG. 1 illustrates a gas turbine engine 10 of a type provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to low pressure rotor(s) 30 of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and an output shaft through which power is transferred. A turboprop engine may also apply. In addition, although the engine 10 is described herein for flight applications, it should be understood that other uses, such as industrial or the like, may apply.

The engine 10 may include one or more variable geometry mechanisms (VGMs) which may assist in guiding airflow through the engine 10. In some embodiments, the VGMs consist of one or more variable guide vanes (VGVs), which may be one of inlet compressor guide vanes for directing air into the compressor section 14, outlet guide vanes for directing air out of the compressor section 14, variable stator vanes for directing incoming air into rotor blades of the engine 10, and/or one or more of variable nozzles, variable bleed-off valves, and the like. One or more of the above-mentioned VGMs may be modulated during the engine starting procedure.

Control of the operation of the engine 10 can be effected by one or more control systems, for example an engine controller 100. The engine controller 100 can modulate a fuel flow rate provided to the engine 10 via a fuel control unit, the position and/or orientation of VGMs within the engine 10, a bleed level of the engine 10, and the like. The engine controller 100 may be configured to start the engine 10, as will be described in more detail herein. In some embodiments, the starting procedure is applied inflight.

The engine controller 100 has access to various measured and/or synthesized operating parameters, such as altitude, calibrated airspeed (VCAS), engine temperatures (i.e. Static ambient temperature (Tamb), T1-T5 and inter-turbine temperature (ITT)), engine fan speed (N1), engine core speed (N2), time, fuel flow ($W_f$), etc. For the purposes of the present disclosure, "operating parameters" refer to any parameters relating to the engine and/or aircraft environment that may be used by the engine controller 100 to set and/or determine engine control parameters. "Engine control parameters" refer to parameters that are controlled, set, modified, and/or modulated by the engine controller 100 for starting the engine 10.

Figure 2:
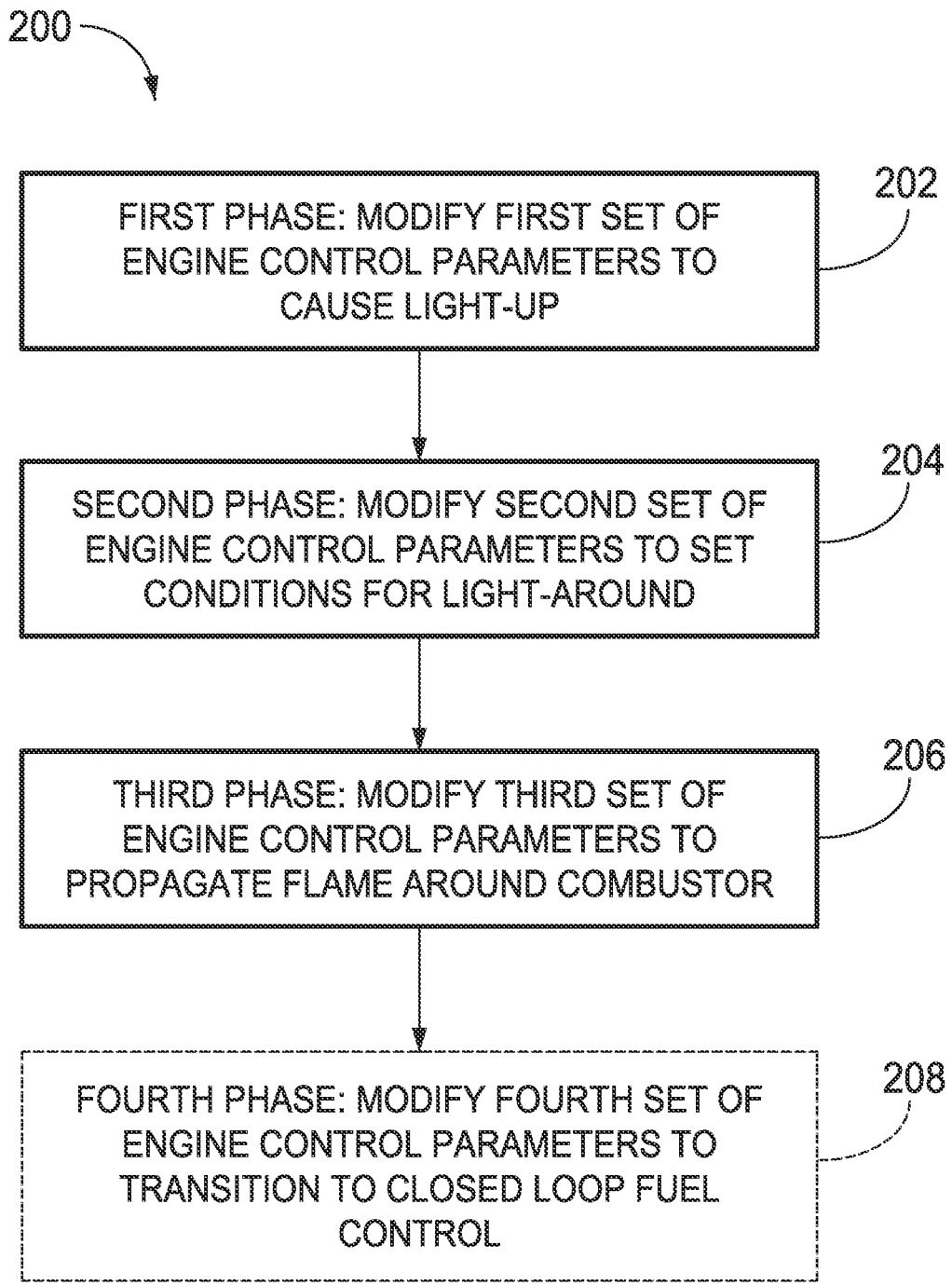
FIG. 2 is a flowchart of an example method for starting a gas turbine engine.

With reference to FIG. 2, there is illustrated an example method 200 for starting a gas turbine engine, such as engine 10. Generally, in a gas turbine engine, inlet air is compressed through the compressor section 14, mixed with fuel in an inflammable proportion in the combustor 16, and then contacted with an ignition source inside the combustor 16 to ignite the mixture, which will then continue to burn. Certain combustors are designed to minimize emissions of gas from the engine. One consequence of this is that it is more difficult for the flames to propagate around the combustor upon light-up to cause light-around. For the purposes of the present disclosure, "light-up" or "light-off" refers to an initial ignition inside the combustor; "light-around" refers to the initial ignition having spread or propagated all around the combustor, to force air flow through a nozzle towards the turbine section 18, for complete ignition. "Complete ignition" refers to a durable combustion inside the combustor 16.

The method 200 is separated into a plurality of sequential, gated phases, whereby different parameters are acted on at each phase. Each phase is dependent on specific criteria using various parameters, such as but not limited to engine exit temperature (T5), N2, rate of change of N2 (N2dot), time, fuel flow, VGMs position, fuel divider valve position, altitude, and VCAS. In some embodiments, one or more of fuel flow amount, fuel flow distribution (via a fuel divider valve), VGM positions, and ignition frequency is applied and/or modified in a predefined and/or adaptive manner throughout the starting procedure.

At step 202, a first phase of the startup is initiated upon receipt of a start request. The first phase comprises modifying a first set of engine control parameters to cause light-up.

At step 204, a second set of engine control parameters are modified in a second phase of the startup. In some embodiments, the second phase is initiated when light-up is detected, which effectively ends the first phase. Alternatively, the second phase may be initiated before light-up is detected, such that there may be a small overlap between the first phase and the second phase. The second phase comprises setting conditions for light-around by modifying a second set of engine control parameters.

At step 206, a third set of engine control parameters are modified in a third phase of the startup. In some embodiments, the third phase is initiated when the light-around conditions are met, which effectively ends the second phase. Alternatively, the third phase may be initiated before the light-around conditions are fully met, such that there may be a small overlap between the second phase and the third phase. The third phase comprises modifying the third set of engine control parameters to propagate a flame around the combustor and cause complete ignition.

In some embodiments, at step 208, a fourth set of engine control parameters are modified in a fourth phase of the startup. In some embodiments, the fourth phase is initiated when compete ignition is detected, which effectively ends the third phase. Alternatively, the fourth phase may be initiated before complete ignition is detected, such that there may be a small overlap between the third phase and the fourth phase. The fourth set of engine control parameters are modified to transition towards a closed loop fuel control. After the fourth phase, the engine is ready for acceleration.

Figure 3A:
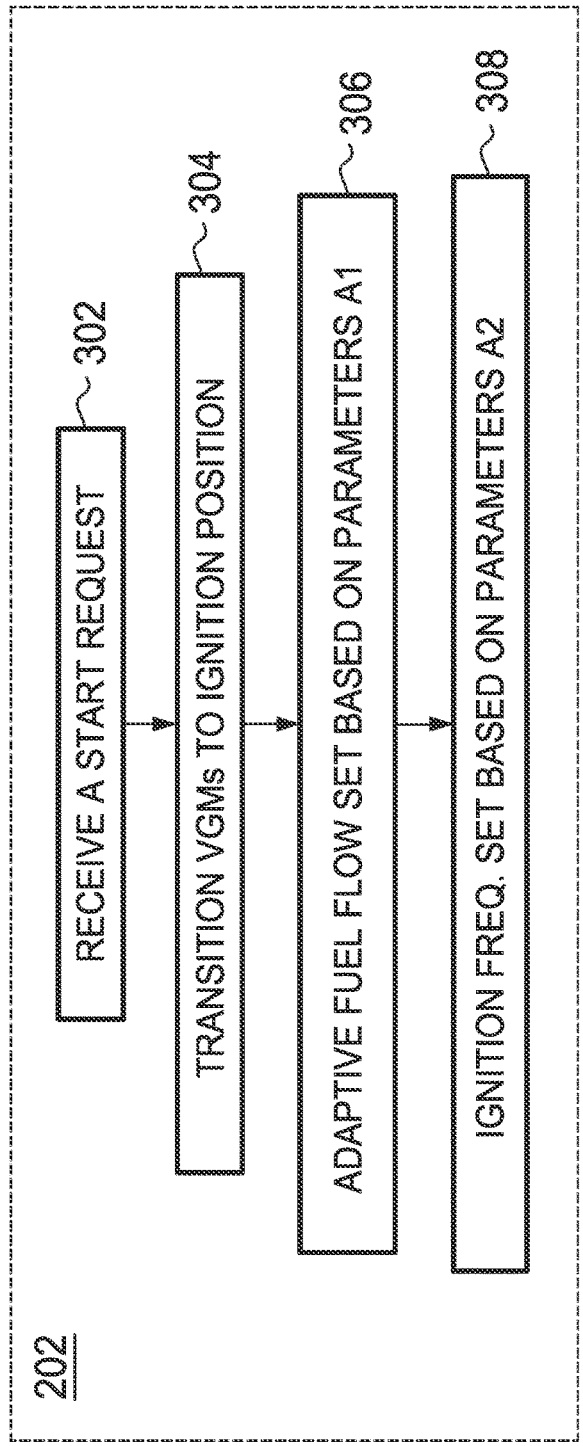
Figure 3B:
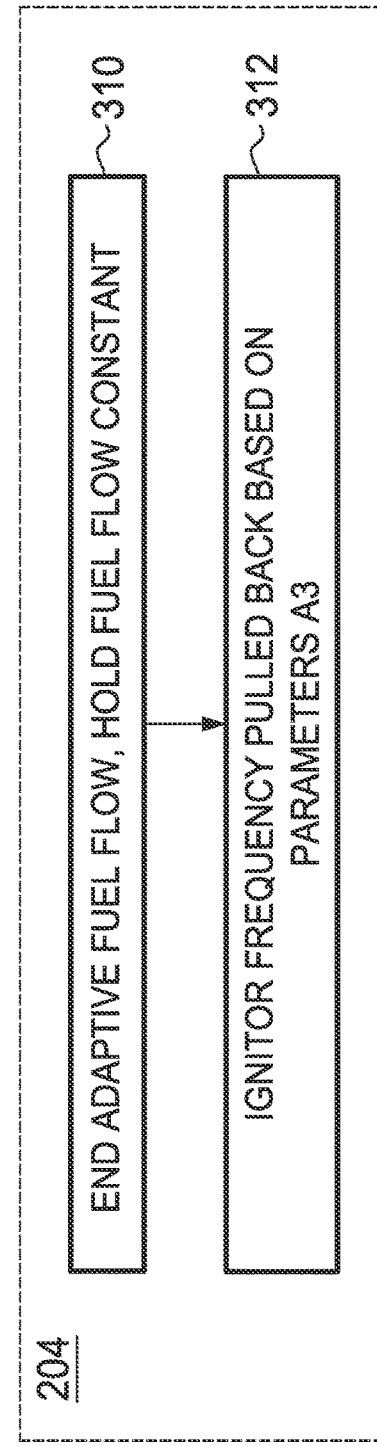
Figure 4:
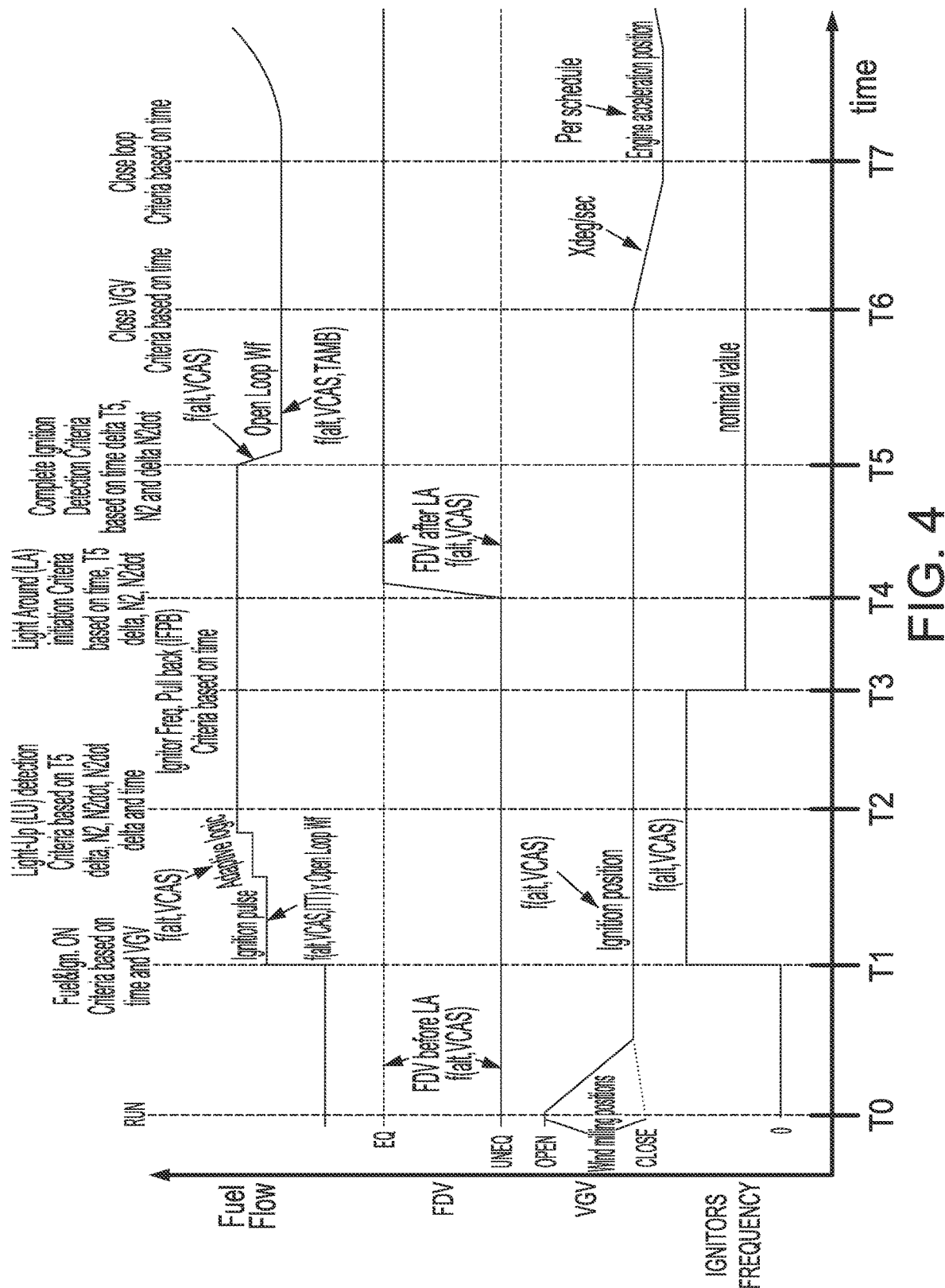
FIG. 4 is a graph showing example modulation of engine control parameters.

A specific and non-limiting example will be presented with reference to FIGS. 3A-3D and FIG. 4. FIGS. 3A-3D are example embodiments of steps 202, 204, 206, and 208, respectively, of the method 200. FIG. 4 is a graph illustrating an example scheduling of fuel flow, FDV, VGMs, and ignitor frequency for each phase.

Referring to FIG. 3A, a start request is received at step 302. At step 304, the VGMs are transitioned from a windmilling position to an ignition position. A windmilling position refers to a position allowing the optimum high spool rotating speed in preparation for in-air relight. An ignition position refers to a position allowing the optimum amount of air in the combustor for ignition.

At step 306, the fuel flow is set to an optimal amount for ignition based on operating parameters A1. In some embodiments, the operating parameters A1 are altitude, VCAS, ITT and Tamb. The objective is to use a minimum number of parameters in order to set an optimum condition for ignition, while preventing stall on light-up. Therefore, any parameter affecting compressor stall margin or combustion quality can be used, such as fuel temperature, combustion chamber pressure, Mach number, N2 (high spool speed), time since shutdown, etc.

An adaptive fuel flow is used to set the fuel flow at step 306, whereby fuel flow is increased by a predefined amount at predefined time intervals until light-up is detected. Other forms of adaptive fuel flow may also apply depending on practical implementations.

At step 308, an ignition frequency is set based on operating parameters A2, which may be for example altitude and VCAS. Other parameters may also be used, such as but not limited to fuel temperature, combustion chamber pressure, Mach number, N2 (high spool speed), and time since shutdown. In some embodiments, the parameters used are related to a thermal state of the engine, since hot engines are less likely to require faster ignitor spark rates to ignite. Generally, the ignition frequency is set for a predefined amount of time, in accordance with ignitor system capabilities.

Steps 304-308 are not necessarily performed sequentially. Each one of step 304, 306, 308 is performed independently within the first phase of the start procedure in accordance with its own parameters, so as to cause light-up. Dependence between the steps 304, 306, 308 may occur due to common operating parameters being used to trigger certain engine control parameters. Referring to FIG. 4, the first phase is shown to occur between times TO and T2. At time T0, the start request is received. At time T2, light-up is detected and the first phase ends. Fuel flow and VGM are modulated starting at time TO. At time T1, ignitor frequency is modulated. Time T1 is also a trigger for applying the ignition fuel flow. After a predefined amount of time past T1, an adaptive logic will progressively increase fuel flow if ignition is not detected. The exact approach may vary as a function of various factors and/or parameters.

Referring to FIG. 3B, the second phase is initiated once light-up is detected, in order to set conditions for light-around. Various criteria may be used to detect light-up, such as a change in engine exit temperature ($\Delta T5$), N2, N2dot, ΔN2dot, and time. Other criteria may also apply. At step 310, the adaptive fuel flow ends and the fuel flow amount is held constant. At step 312, the ignitor frequency is pulled back after a certain amount of time to preserve ignitor life.

Step 310 is triggered as soon as the second phase is initiated. Step 312 is triggered during the second phase, as a function of time. Referring to FIG. 4, the second phase is shown to occur between times T2 and T4. Fuel flow is held constant the entire duration of the second phase. The ignitor frequency changes at T3, with time being a trigger criteria.

Referring to FIG. 3C, the third phase is initiated when the light-around conditions are met. This phase may also be called light-around initiation. Various criteria may be used to determine that light-around conditions have been met, such as time, ΔT5, N2, and N2dot. Other criteria may also apply. At step 314, the FDV position may, for example, be transitioned from an unequalized position to an equalized position, based on operating parameters A3. Placing the FDV in an equalized position will change the fuel flow distribution between the primary and secondary fuel nozzles and ease propagation of the flame all around the combustor. Other examples for positioning the FDV include maintaining an equalized position, maintaining an unequalized position, and transitioning from an equalized to an unequalized position. In some embodiments, the operating parameters A3 are altitude and VCAS. In other embodiments, the operating parameters A3 also include ITT and time since shutdown. Parameters related to the engine thermal state are considered since a hot engine may not require a transition to the FDV in order to propagate the flame around the combustor. Referring to FIG. 4, the third phase is shown to occur between times T4 and T5. Fuel flow, VGM position, and ignitor frequency are shown to remain constant during the third phase.

Referring to FIG. 3D, the fourth phase is initiated when complete ignition is detected. The fourth phase allows for a transition to closed loop fuel control and to compressor acceleration with surge protection. Various criteria may be used to determine that complete ignition has occurred, such as time, ΔT5, N2, and ΔN2dot. Other criteria may also apply. At step 316, fuel flow is reduced based on operating parameters A4. Reduction of fuel flow may be done to minimize a risk of stalling and exceeding engine temperature limits while still allowing for stable combustion and engine acceleration.

In some embodiments, the operating parameters A4 are altitude, VCAS, and ambient temperature. Any parameter affecting stable combustion and compressor stall margin may be used in various combinations. In addition, the rate at which the fuel flow is reduced may be based on operating parameters A5, such as altitude, VCAS, and other parameters affecting stable combustion and compressor stall margin.

At step 318, VGMs are moved from the ignition position to an engine acceleration position based on time, N2, N2dot, and/or others. An engine acceleration position refers to a position allowing the optimum high spool compressor stall margin for a stall free acceleration. Referring to FIG. 4, the fourth phase is shown to occur between times T5 and T7. Fuel flow is reduced to a fixed, predefined value. The VGMs are moved at time T6.

After time T7, a closed loop fuel flow control approach takes over as the engine has successfully started. Optimal conditions for acceleration are considered achieved. The engine will accelerate to idle at a suitable rate.

Figure 5:
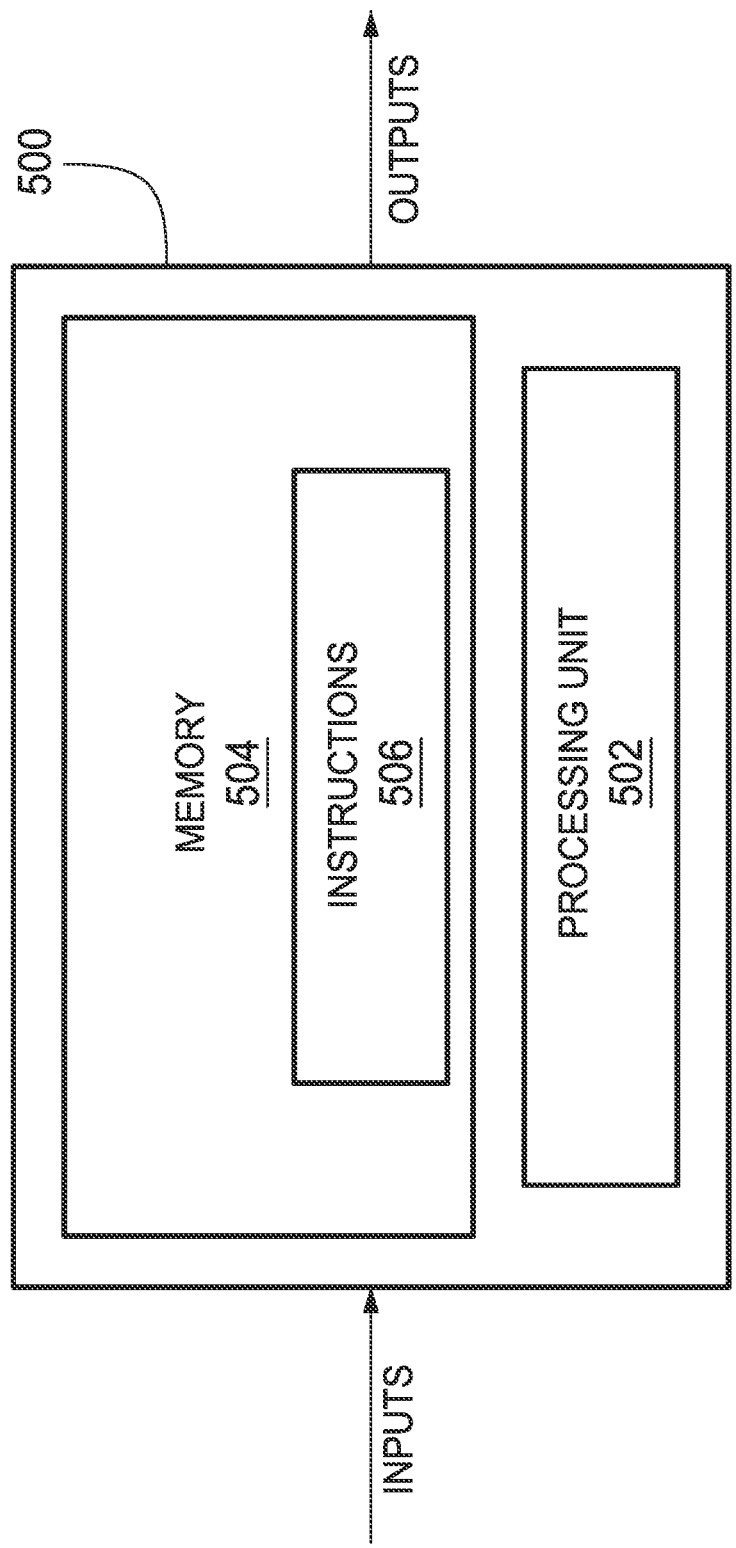
FIG. 5 is block diagram of an example computing device.

FIG. 5 is an example embodiment of a computing device 500 for implementing parts or all of the method 200 described above. The computing device 500 comprises a processing unit 502 and a memory 504 which has stored therein computer-executable instructions 506. The processing unit 502 may comprise any suitable devices configured to cause a series of steps to be performed such that instructions 506, when executed by the computing device 500 or other programmable apparatus, may cause the functions/acts/steps specified in the method 200 described herein to be executed. The processing unit 502 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

It should be noted that the computing device 500 may be implemented as part of a FADEC or other similar device, including an electronic engine control (EEC), engine control unit (EUC), engine electronic control system (EECS), an Aircraft Avionics System, and the like. In addition, it should be noted that the techniques described herein can be performed by a computing device 500 substantially in real-time.

The methods and systems for starting a gas turbine engine as described herein may be implemented in a high level procedural or object oriented programming or scripting language, or a combination thereof, to communicate with or assist in the operation of a computer system, for example the computing device 500. Alternatively, the methods and systems for starting a gas turbine engine may be implemented in assembly or machine language. The language may be a compiled or interpreted language. Program code for implementing the methods and systems for starting a gas turbine engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for starting a gas turbine engine may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure. For example, it will be understood that different engine control parameters may be modulated, based on different operating parameters. A different number of phases may also apply, and the criteria for transitioning from one phase to another may differ and be adapted to different engine applications.

Various aspects of the methods and systems for starting a gas turbine engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. The scope of the following claims should not be limited by the embodiments set forth in the examples, but should be given the broadest reasonable interpretation consistent with the description as a whole.

The invention claimed is:

1. An adaptive method for starting an aircraft gas turbine engine based on operating parameters of the gas turbine engine, the method comprising:
setting a fuel flow rate and an ignition frequency based on the operating parameters of the gas turbine engine;
in a first phase of a startup causing light-up, upon receipt of a start request:
providing fuel to a combustor of the gas turbine engine according to the fuel flow rate;
driving an ignitor system of the gas turbine engine according to the ignition frequency when fuel is provided to the combustor; and
when light-up is not detected, increasing the fuel flow rate of the fuel being provided to the combustor based on the operating parameters of the gas turbine engine;
in a second phase of the startup causing light-around, driving the ignitor system when providing fuel to the combustor of the gas turbine engine; and
in a third phase of the startup causing a flame to propagate around the combustor of the gas turbine engine, transitioning a fuel divider valve to change a fuel flow distribution between different fuel nozzles associated with the combustor while keeping the fuel flow rate to the combustor constant, the transitioning of the fuel divider valve being based on the operating parameters of the gas turbine engine.

2. The method of claim 1, wherein the second phase is initiated when light-up is detected, and the third phase is initiated when conditions for light-around are met.

3. The method of claim 1, further comprising, in a fourth phase of the startup, modifying a set of engine control parameters to transition to a closed loop fuel control.

4. The method of claim 3, wherein the fourth phase is initiated when complete ignition is detected.

5. The method of claim 3, wherein modifying the set of engine control parameters comprises reducing fuel flow to the combustor to a fixed predefined value based on altitude, calibrated airspeed and ambient temperature.

6. The method of claim 5, wherein modifying the set of engine control parameters further comprises transitioning variable geometry mechanisms of the engine from an ignition position to an acceleration position.

7. The method of claim 1, wherein the first phase includes transitioning a variable geometry mechanism of the gas turbine engine from a windmilling position to an ignition position.

8. The method of claim 1, wherein the transition of the fuel divider valve is based on altitude and calibrated airspeed of the aircraft.

9. A system for starting an aircraft gas turbine engine based on operating parameters of the gas turbine engine, the system comprising:
a processing unit; and
a non-transitory computer-readable medium having stored thereon program instructions executable by the processing unit for:
setting a fuel flow rate and an ignition frequency based on the operating parameters of the gas turbine engine;
in a first phase of a startup causing light-up, upon receipt of a start request:
causing fuel to be provided to a combustor of the gas turbine engine according to the fuel flow rate;
causing an ignitor system of the gas turbine engine to be driven according to the ignition frequency when fuel is provided to the combustor; and
when light-up is not detected, causing the fuel flow rate of the fuel being provided to the combustor to be increased based on the operating parameters of the gas turbine engine;
in a second phase of the startup causing light-around, causing the ignitor system to be driven when the fuel is provided to the combustor of the gas turbine engine; and
in a third phase of the startup causing a flame to propagate around the combustor of the gas turbine engine, causing a fuel divider valve to be transitioned to change a fuel flow distribution between different fuel nozzles associated with the combustor while keeping the fuel flow rate to the combustor constant, the transitioning of the fuel divider valve being based on the operating parameters of the gas turbine engine.

10. The system of claim 9, wherein the program instructions executable by the processing unit for initiating the second phase when light-up is detected, and initiating the third phase when conditions for light-around are met.

11. The system of claim 9, wherein the program instructions executable by the processing unit for, in a fourth phase of the startup, modifying a set of engine control parameters to transition to a closed loop fuel control.

12. The system of claim 11, wherein the fourth phase is initiated when complete ignition is detected.

13. The system of claim 11, wherein modifying the set of engine control parameters comprises reducing fuel flow to the combustor to a fixed predefined value based on altitude, calibrated airspeed and ambient temperature.

14. The system of claim 13, wherein modifying the set of engine control parameters further comprises transitioning variable geometry mechanisms of the engine from an ignition position to an acceleration position.

15. The system of claim 9, wherein the first phase includes causing a variable geometry mechanism of the gas turbine engine to transition from a windmilling position to an ignition position.

16. The system of claim 9, wherein the transition of the fuel divider valve is based on altitude and calibrated airspeed of the aircraft.

17. A computer-readable storage medium having stored thereon program code executable by a processor for starting a gas turbine engine based on operating parameters of the engine, the program code executable for:

setting a fuel flow rate and an ignition frequency based on the operating parameters of the gas turbine engine;

in a first phase of a startup causing light-up, upon receipt of a start request:

causing fuel to be provided to a combustor of the gas turbine engine according to the fuel flow rate;

causing an ignitor system of the gas turbine engine to be driven according to the ignition frequency when fuel is provided to the combustor; and when light-up is not detected, causing the fuel flow rate of the fuel being provided to the combustor to be increased based on the operating parameters of the gas turbine engine;

in a second phase of the startup causing light-around, causing the ignitor system to be driven when the fuel is provided to the combustor of the gas turbine engine; and in a third phase of the startup causing a flame to propagate around the combustor of the gas turbine engine, causing a fuel divider valve to be transitioned to change a fuel flow distribution between different fuel nozzles associated with the combustor while keeping the fuel flow rate to the combustor constant, the transitioning of the fuel divider valve being based on the operating parameters of the gas turbine engine.

18. The computer-readable storage medium of claim 17, wherein the program code is further executable for, in a fourth phase of the startup, modifying a set of engine control parameters to transition to a closed loop fuel control.

* * * * *